United States Patent
Michels et al.

(10) Patent No.: US 6,549,519 B1
(45) Date of Patent: *Apr. 15, 2003

(54) NETWORK SWITCHING DEVICE WITH PIPELINED SEARCH ENGINES

(75) Inventors: Timothy Scott Michels, Spokane, WA (US); James E. Cathey, Greenacres, WA (US); Greg W. Davis, Spokane, WA (US); Bernard N. Daines, Spokane, WA (US)

(73) Assignee: Alcatel Internetworking (PE), Inc., Spokane, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,603

(22) Filed: Oct. 5, 1998

Related U.S. Application Data

(60) Provisional application No. 60/072,280, filed on Jan. 23, 1998.

(51) Int. Cl.$^7$ ............. G06F 11/00; G06F 7/38; G06F 15/173; H03M 13/03
(52) U.S. Cl. ............. 370/238; 370/392; 370/397; 370/389; 708/509; 709/238; 714/796
(58) Field of Search ............. 370/230, 231, 370/235, 238, 254, 256, 389, 392, 397, 428, 429, 408, 411; 708/508, 509, 521, 522; 709/238, 230, 252, 224, 242, 245; 704/242; 707/6, 8; 711/150, 157, 168, 169; 714/795, 796, 797

(56) References Cited

U.S. PATENT DOCUMENTS

| | | | |
|---|---|---|---|
| 5,214,639 A | | 5/1993 | Herion .................. 370/60 |
| 5,386,413 A | * | 1/1995 | McAuley et al. ........... 370/392 |
| 5,414,704 A | | 5/1995 | Spinney |

(List continued on next page.)

OTHER PUBLICATIONS

"An Overview of the Pipelined Copmmon Buffer Architecture (PCBA) Based packet/Cell Switching System" pp. 288–297 by Chang et al., IEEE 1994.*
U.S. patent application Ser. No. 09/166,343, Johnson et al.
U.S. patent application Ser. No. 09/166,620, Michels et al.
U.S. patent application Ser. No. 09/776,940, Michels et al.

Primary Examiner—Alpus H. Hus
Assistant Examiner—Afsar M Qureshi
(74) Attorney, Agent, or Firm—Christie, Parker & Hale, LLP

(57) ABSTRACT

A switching device for forwarding network traffic to a desired destination on a network, such as a telephone or computer network. The switching device includes multiple ports and uses a lookup table to determine which port to forward network traffic over. The lookup table includes network addresses that are maintained in ascending or descending order. The switching device includes multiple binary search engines coupled in series including one or more precursor binary search engines and a final stage binary search engine. Together, the binary search engines perform an N iteration binary search. Additionally, a single search engine can perform multiple concurrent searches so that source and destination addresses can be obtained simultaneously and without wasted memory cycles.

35 Claims, 10 Drawing Sheets

U.S. PATENT DOCUMENTS

| | | | |
|---|---|---|---|
| 5,459,724 A | 10/1995 | Jeffrey et al. | 370/60 |
| 5,608,726 A | 3/1997 | Virgile | 370/401 |
| 5,748,905 A * | 5/1998 | Hauser et al. | 709/249 |
| 5,796,944 A * | 8/1998 | Hill et al. | 709/250 |
| 5,895,500 A * | 4/1999 | Thomason et al. | 360/78.07 |
| 5,905,725 A | 5/1999 | Sindhu et al. | 370/389 |
| 5,909,440 A | 6/1999 | Ferguson et al. | |
| 5,909,686 A * | 6/1999 | Muller et al. | 707/104 |
| 5,938,736 A * | 8/1999 | Muller et al. | 709/243 |
| 5,946,679 A | 8/1999 | Ahuja et al. | 707/3 |
| 6,006,306 A | 12/1999 | Haywood et al. | 711/108 |
| 6,011,795 A | 1/2000 | Varghese et al. | 370/392 |
| 6,023,466 A * | 2/2000 | Luijten et al. | 341/102 |
| 6,032,190 A | 2/2000 | Bremer et al. | 709/238 |
| 6,081,522 A * | 6/2000 | Hendel et al. | 370/392 |
| 6,161,144 A | 12/2000 | Michels et al. | 709/238 |
| 6,259,699 B1 * | 7/2001 | Opalka et al. | 370/398 |

\* cited by examiner

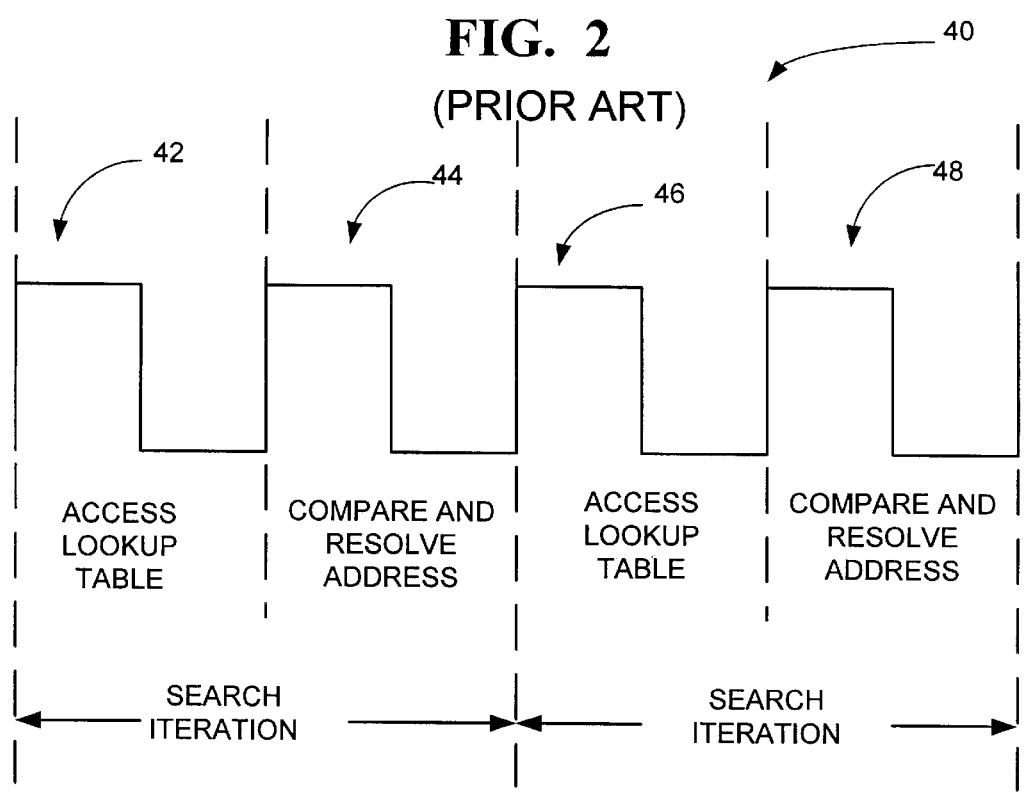

| MEMORY ADDR. | NETWORK ADDR. | PORT NO. |
|---|---|---|
| 0000 | | |
| 0001 | 5 | 0 |
| 0010 | 8 | 1 |
| 0011 | 11 | 0 |
| 0100 | 14 | 2 |
| 0101 | 17 | 2 |
| 0110 | 20 | 2 |
| 0111 | 23 | 1 |
| 1000 | 26 | 4 |
| 1001 | 29 | 3 |
| 1010 | 32 | 5 |
| 1011 | 35 | 2 |
| 1100 | 38 | 1 |
| 1101 | 41 | 0 |
| 1110 | 44 | 2 |
| 1111 | 47 | 3 |

ADDR. PASSING BETWEEN SEARCH ENGINES

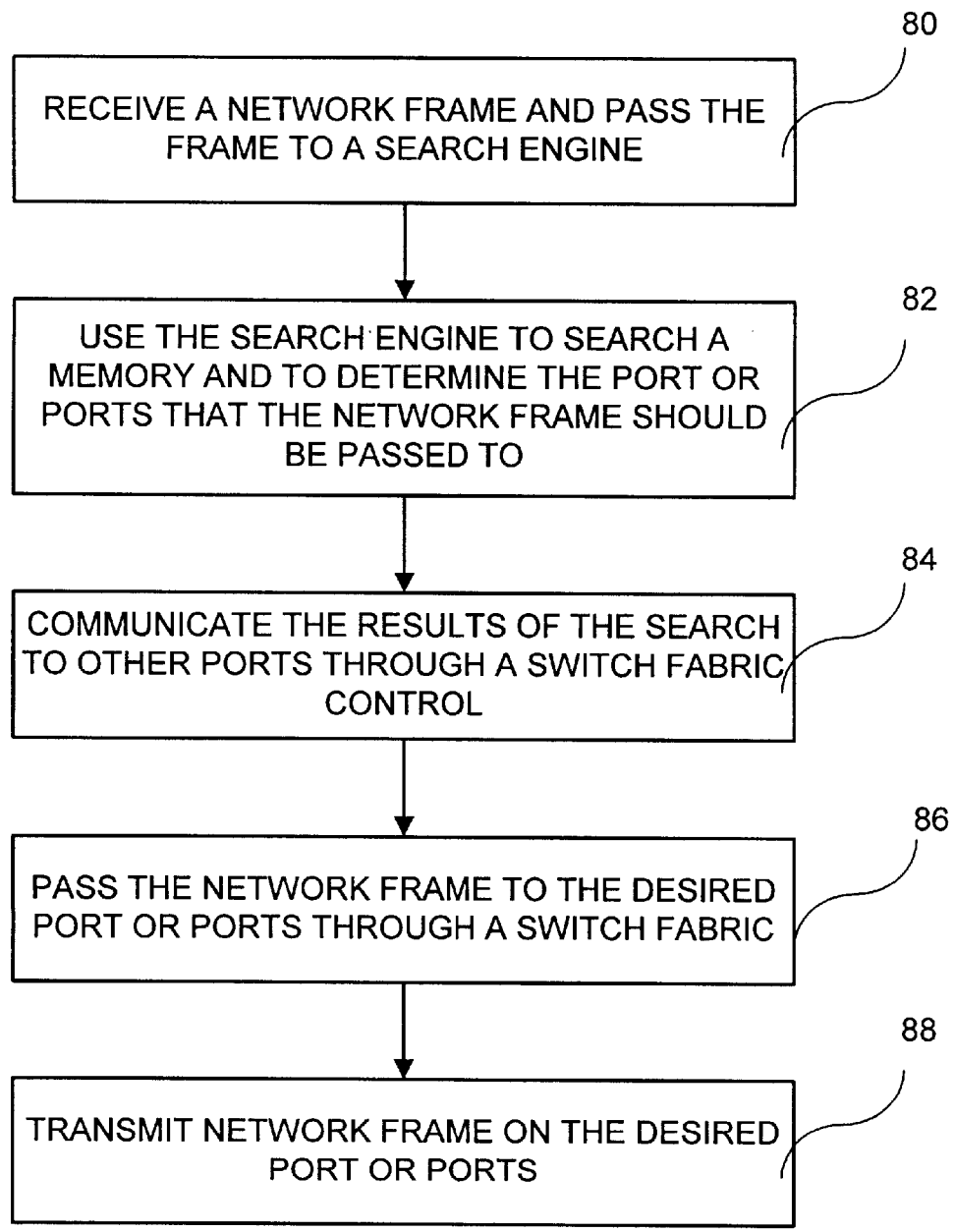

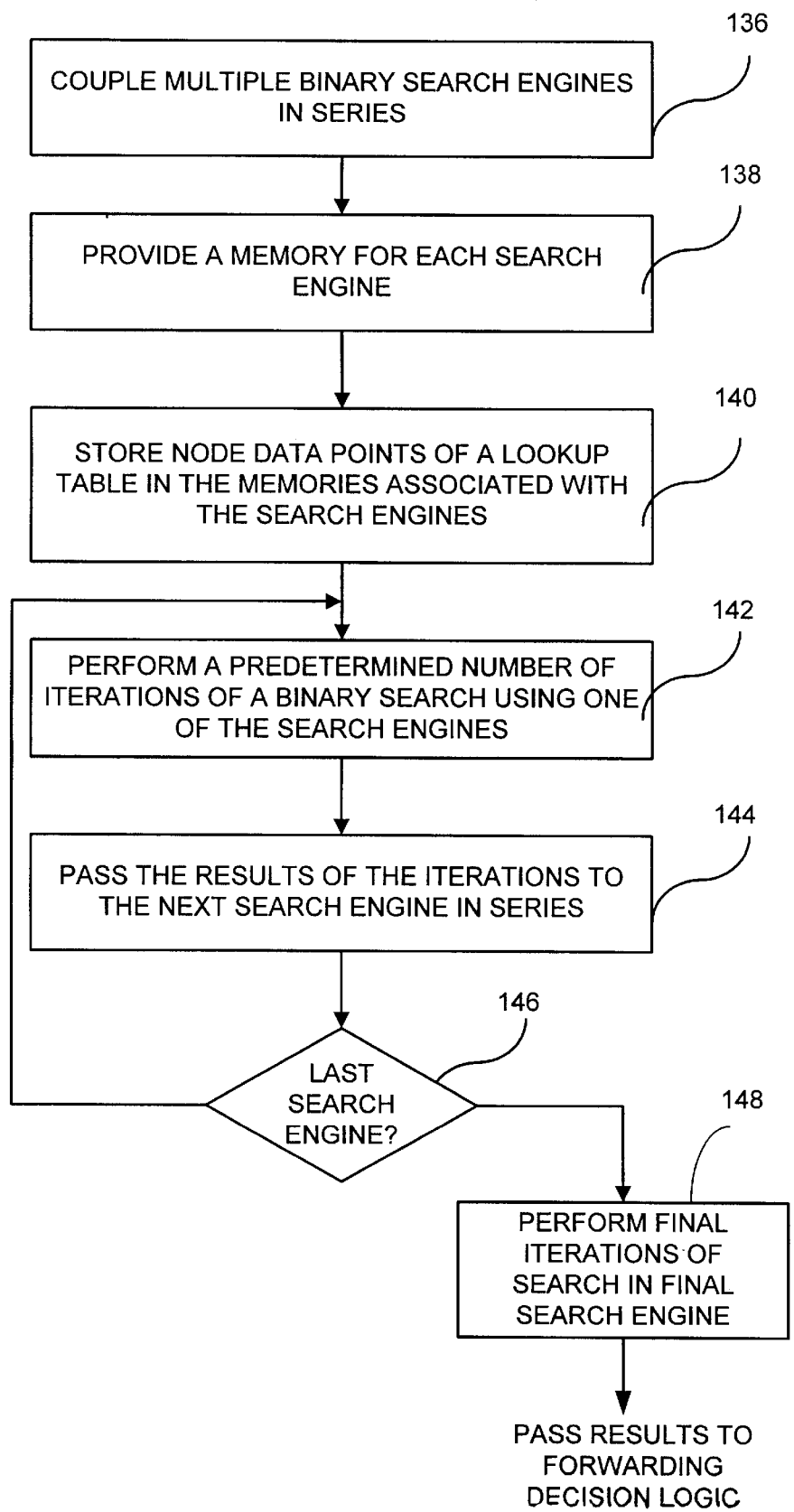

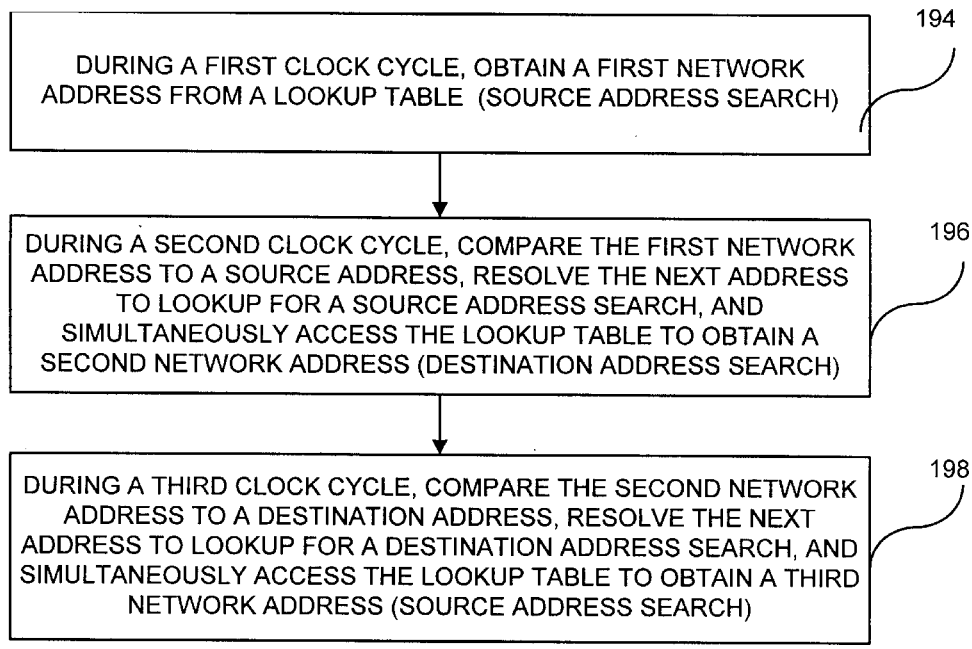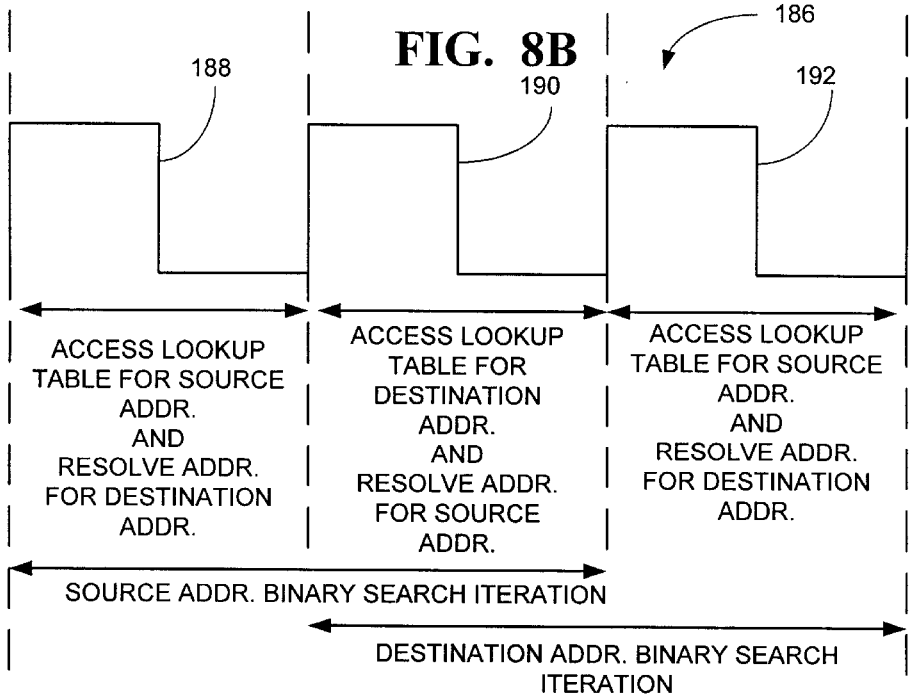

NETWORK SWITCHING DEVICE WITH PIPELINED SEARCH ENGINES

CROSS-REFERENCE TO RELATED APPLICATION

This application is based on provisional U.S. patent application Ser. No. 60/072,280 filed Jan. 23, 1998, and entitled "Forwarding Database Lookup Technique."

FIELD OF THE INVENTION

This invention relates generally to networks, such as telephone and computer networks, and, more particularly, relates to routing information through such networks.

BACKGROUND OF THE INVENTION

A network allows two or more parties to communicate with each other. In their simplest form, networks generally include transmission lines and switching devices (e.g., routers, switches, switching routers, etc.). The transmission lines carry signals (e.g., electrical, optical, etc.), while the switching devices are intermediate stations that establish temporary connections between transmission lines. In telephone networks, for example, a caller's line goes to a switching device where the actual connection is made to the called party. In computer networks, devices such as routers receive messages on the network and forward the messages to their correct destinations. Computer networks can be as small as a local area network (LAN) consisting of a few computers, printers, and other devices, or it can consist of many computers distributed over a vast geographical area (e.g., the Internet).

An example computer network 10 is shown in FIG. 1A. The network includes two local segments 12 and 14, and connection to a remote network 16. Nodes, labeled as A–J, represent computers connected to the local segments. A switching device 20 includes three ports 22–24 and switches network traffic between segments 12, 14, and the remote network 16. Network 16 may also include switching devices, such as switching device 21, which then connects other segment (not shown) to the network. Switching device 20 allows the nodes on one segment to communicate with nodes on other segments and to other switching devices. The nodes communicate with each other through a protocol (e.g., HTTP, TCP/IP, SMB, etc.) which allows the nodes to transmit and receive network frames (a network frame includes a destination address, a source address, and a data field). When switching device 20 receives a frame from a node, it analyzes the destination address by searching a lookup table 26, shown in FIG. 1B. Lookup table 26 includes table entries having a network address field and a port field. When the destination address is matched to a network address in the lookup table, switching device 20 determines which port to forward the frame to by obtaining the port number corresponding to the matched network address. For example, if node A on segment 12 sends a message to node H on segment 14, switching device 20 receives the message from node A and in response searches the entries in the network address field of lookup table 26. Table entry 28 contains the network address for H. A corresponding port field 30 for network address H indicates that the frame should be forwarded over port 2. Additional background information on switches can be found in a number of references, such as *Fast Ethernet* (1997) by L. Quinn et al., *Computer Networks* ($3^{rd}$ Ed. 1996 by A. Tannenbaum, and *High-Speed Networking with LAN Switches* (1997) by G. Held, all of which are incorporated herein by reference.

The switching device can obtain the network addresses for the lookup table in different ways, depending on the particular implementation of the switching device. For example, the switching device may snoop network traffic so that when a frame is received on a port, the switching device determines if the frame's source address is in the table and, if it is not, adds an entry containing the source address and the inbound port to the table. Thus, the switching device is said to "learn" addresses and port numbers from any frame that is transmitted by a node. Another technique some switching devices (e.g., routers) use to obtain the lookup table is from other switching devices through a special protocol. Thus, routers supply network addresses to each other to supplement their lookup tables.

Consequently, when a network frame is received in a switch, both the source and destination addresses must be searched in the lookup table—the source address for "learning" and the destination address for forwarding. To search the lookup table, a single search engine (not shown) within the switch 20 sequentially accesses lookup table entries and compares the entries to the destination address in the network frame. After the search for the destination address is completed, a second independent search is performed for the source address. An example timing diagram 40 for the search engine is shown in FIG. 2. During a first clock cycle 42, the search engine accesses the lookup table and obtains a network address. During a second clock cycle 44, the search engine compares a network address obtained from the lookup table to the destination address. The first and second clock cycles together form a single iteration of the search. If there is no match, the search engine loads an address for the next lookup table entry to analyze. The process is repeated during clock cycles 46 and 48 (a second iteration), and so on until a match is found or the search fails. After the search for the destination address is completed, a second search is performed for the source address. Unfortunately, given current memory and ASIC speed limitations, the above-described technique for searching the lookup table is too slow to meet the requirements of recently-developed gigabit switches. Additionally, with sequential searching, the lookup table is only accessed every other clock cycle, wasting valuable time.

An objective of the present invention, therefore, is to provide a high-speed network switching device that can quickly and efficiently search through address lookup tables and that overcomes the limitations of the prior art.

SUMMARY OF INVENTION

The present invention provides a switching device (e.g., router, switch, switching router, telephone switch, etc.) that forwards network traffic to a desired destination on a network, such as a telephone or computer network. The switching device includes multiple ports and uses a lookup table to determine which port to forward network traffic over. The network traffic is typically in the form of network frames that include source and destination addresses.

In one aspect of the invention, the lookup table includes network addresses that are maintained in sorted order (e.g., ascending or descending order) to facilitate binary searches. Additionally, multiple binary search engines are connected in series and perform multiple binary searches simultaneously. Rather than having each binary search engine perform an independent search, the binary search engines each perform a predetermined number of iterations of an N iteration search. Additionally, each search engine has a separate memory, which stores only data (nodes from the lookup table) necessary for its respective iterations of the search. When a search engine completes its iterations of the search, the results are passed to the next search engine in the series. The next search engine uses the results from the previous search engine as a starting point to performing its respective iterations of the binary search. The number of search engines connected in series (also called pipelining) can vary between two and N, where N is the number of iterations needed for a binary search to complete. If N search engines are used, each search engine performs only one iteration.

By pipelining search engines, increased throughput is achieved. Additionally, by storing only the data necessary for a predetermined number of iterations, very little memory space is needed. For example, a lookup table with 64 K entries requires 16 iterations ($2^{16}$=64 K) to search the entire table using a binary search. If two search engines are used, each search engine performs 8 iterations each. The first search engine's memory only stores 256 entries ($2^8$), while the second search engine stores either all 64 K entries or the remainder of the entries after extraction of the 256 entries from the lookup table.

In another aspect of the invention, each search engine may perform concurrent source and destination searches of the lookup table. That is, during one clock cycle, the search engine performs part of a search for the destination address of the network frame and during the next clock cycle the search engine performs part of a search for a source address. Thus, one search engine performs two independent searches concurrently. Moreover, while the lookup table is being accessed for the destination address, the source address from the previous look up is being analyzed so that a next source address may be calculated. Likewise, when the lookup table is being accessed for the source address, the previously obtained destination address is analyzed. The concurrent source and destination address lookups allow the search engines to search at twice the speed of search engines performing linear searches. Additionally, the lookup table is accessed during every clock cycle rather than sitting idle during some clock cycles. Performing concurrent searches is independent of the algorithm used. Thus, binary, linear, CAM, binary radix trees, hashing and other types of searches can be used.

It will be recognized by those skilled in the art that the two described aspects of the invention can be performed independent of one another. That is, a switching device may have just one binary search engine (as opposed to multiple search engines in series) that performs concurrent source and destination address searches. Additionally, a switching device may have multiple search engines connected in series wherein the search engines do not perform concurrent searches. Alternatively, a switching device may include both aspects with search engines coupled in series and with the search engines performing concurrent searches.

These advantages and other advantages and features of the inventions will become apparent from the following detailed description, which proceeds with reference to the following drawings.

BRIEF DESCRIPTION OF DRAWINGS

FIG. 2 shows a timing diagram of a search engine within the switching device of FIG. 1A.

FIG. 5 shows a flowchart of a method for forwarding network frames in the switching device of FIG. 3.

FIG. 6 shows a flowchart of a method for performing different iterations of a binary search in separate binary search engines.

FIG. 8A shows a flowchart of a method for concurrently performing source and destination searches using the binary search engine of FIG. 7.

FIG. 8B is a timing diagram for the binary search engine of FIG. 7.

DETAILED DESCRIPTION OF AN ILLUSTRATIVE EMBODIMENT

Figures 1A, 1B:
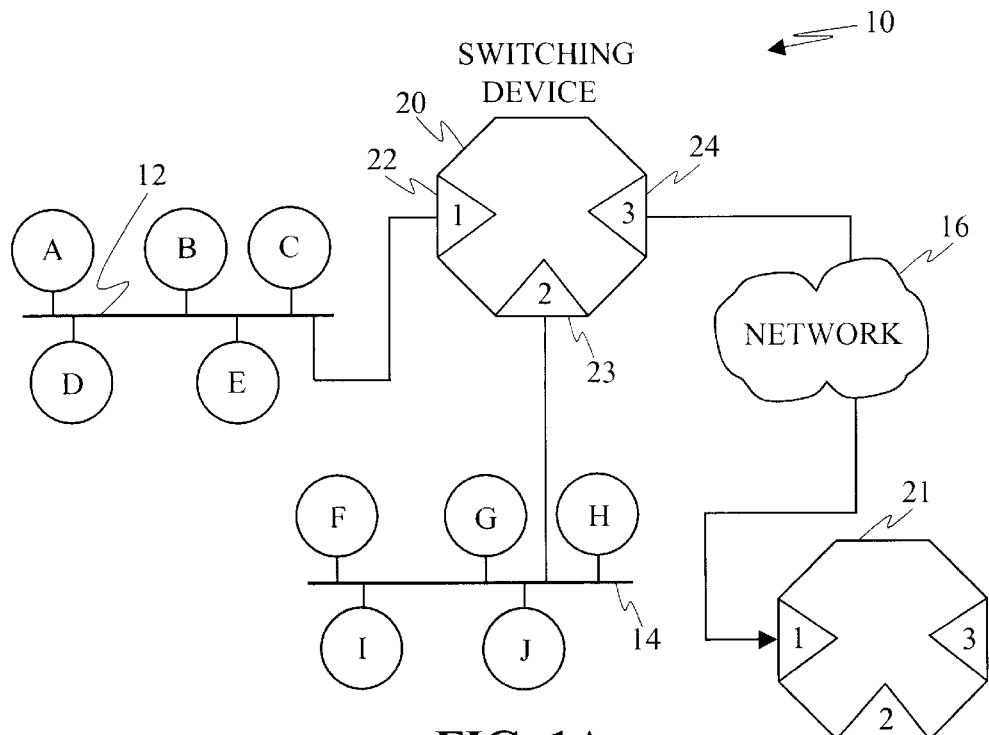
FIG. 1A shows a known network containing multiple segments connected through a switching device.
FIG. 1B shows a known lookup table stored in the switching device for identifying nodes connected to the segments.
Figure 3:
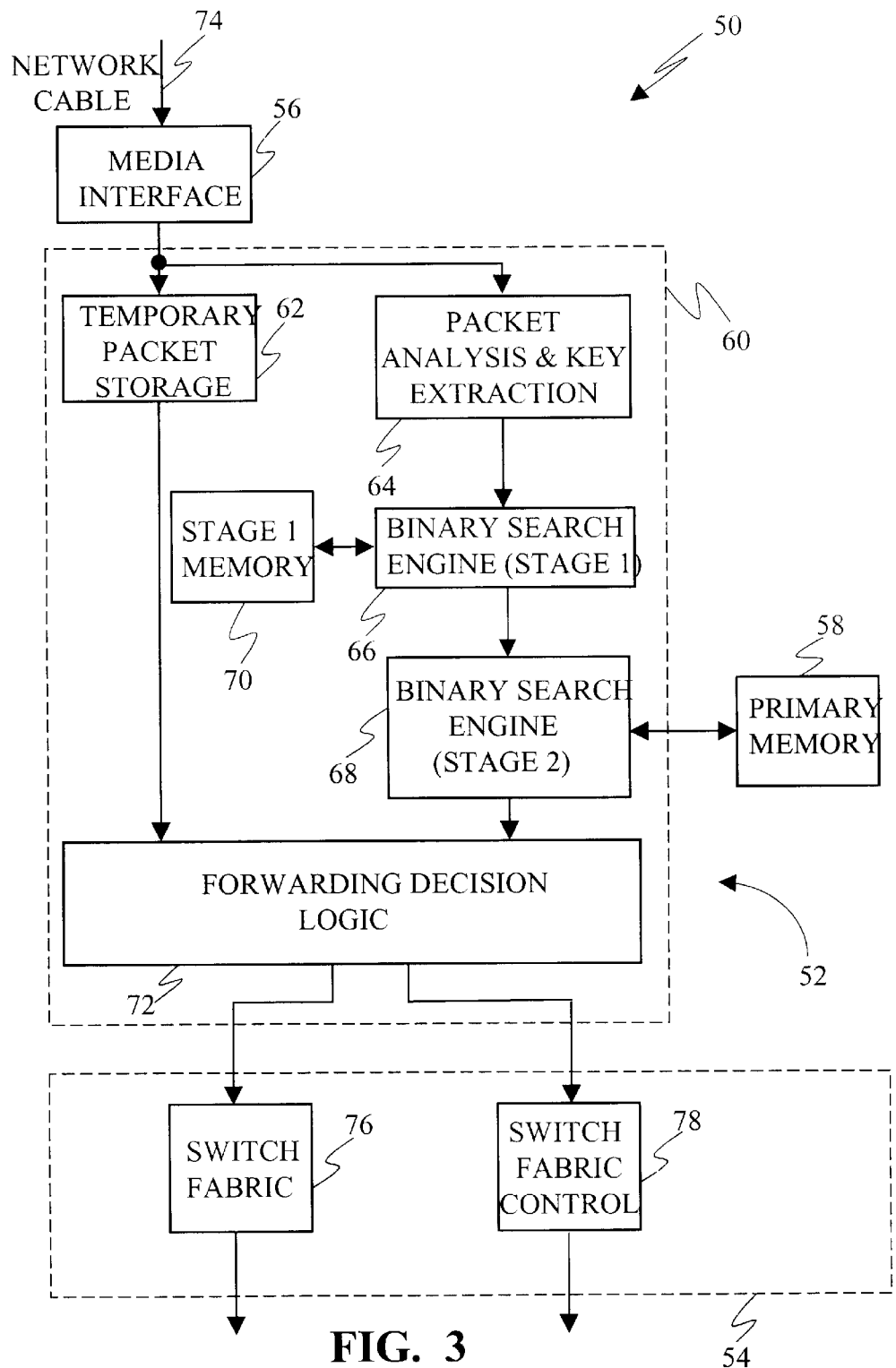
FIG. 3 shows a switching device according to one aspect of the invention with two binary search engines coupled in series.

FIG. 3 shows a switching device 50 having a port 52 and port intercommunication logic 54. Port 52 includes a media interface 56, a primary memory 58, and a search engine 60. The search engine 60 includes temporary packet storage 62, packet analysis and key extraction logic 64, two internal binary search engines 66, 68, a first stage memory 70, and forwarding decision logic 72. There are multiple ports (not shown) in switching device 50. One or more ports are located on channel cards (not shown) mounted in a chassis. The number of ports and how the ports and port intercommunication logic 54 are mounted within a chassis are based on the particular application and are not important to the invention.

Media interface 56 connects switching device 50 to a network (not shown) through a network cable 74. The network cable can take a variety of forms (e.g., fiber optic, twisted-pair, coaxial, etc.) depending on the type of network. A variety of network standards and protocols may be used, such as TCP/IP, IPX/SPX, FDDI, ATM, ETHERNET, GIGABIT ETHERNET, FAST ETHERNET, Token Ring, SONET, 100-base TX, etc. Other network protocols, standards, and network cables now existing or later developed may be used with the invention, since these particular aspects are not important to the invention. Media interface 56 is a communication link between search engine 60 and the network. Thus, media interface 56 allows search engine 60 to send network frames in any desired format and media interface 56 reformats the frames for the particular network. Similarly, media interface 56 receives network frames from the network and formats the frames so they may be read by search engine 60. The media interface used is based on the particular application and is not important to understanding the invention.

Temporary packet storage 62 within search engine 60 holds the network frame temporarily while other components within the search engine determine where to forward the network frame to, as is further described below. In some circumstances, a decision may be made to not forward the packet at all. In such cases, the network frame is never passed to the port intercommunication logic. Depending on the size of the network frame, the temporary packet storage 62 may hold several network frames, or, alternatively, only a portion of a network frame as it is forwarded to another port.

Packet analysis and key extraction logic 64 extracts the source and destination addresses from the network frame and forwards the addresses to the first binary search engine 66. The packet analysis and key extraction logic 64 may also pass additional information to the binary search engine 66, such as virtual LAN information that comes with the network frame or is derived based on the type of network frame. This additional information is appended to the source and destination addresses to form a key. One skilled in the art will recognize that the key may include any desired information, depending on the particular application. For example, the key may contain only the destination address, or only the source and destination addresses, or the source and destination addresses and additional information. For simplicity, the key is described generically below as being the source and destination addresses.

Binary search engines 66 and 68 are coupled to respective memories 58 and 70. The memories together store a lookup table that the binary search engines use for analyzing network frames received from media interface 56. A portion of an example lookup table is shown in FIG. 4 and is further described below. A management processor (not shown) is coupled to search engines 66, 68 and maintains the lookup table in memories 58, 70. Specifically, the management processor may direct the search engines to delete old table entries, insert new table entries and generally maintain the table in sorted order so that the search engine 60 performs searches efficiently and correctly.

As is described in detail below, binary search engines 66, 68 perform a binary search on the lookup table. A binary search is a technique for searching a sorted table where successive midpoints of the table are determined and compared against a search term. Thus, to start the search the midpoint of the table is compared against the search term. By using the midpoint, the table is effectively divided into two parts and a determination is made as to which of the two parts the search term must reside in. Only the part that has the search term is analyzed and the other part is ignored. The midpoint of the pertinent part is then determined to divide the table into two more parts, and so on until the key is found or the search fails. Binary searches are understood in the art and are described in a text entitled *Design and Analysis of Algorithms* by Jeffrey D. Smith, 1989. Binary searches require a predetermined number of "iterations" to complete. The number of iterations depends on the size of the lookup table and follows the formula $\log_2 N$ =number of iterations, where N is the number of entries in the table. Thus, a 64 K table requires 16 iterations to complete a binary search, while a 256 entry table requires 8 iterations to complete.

One aspect of the invention is that the binary search engines divide the binary search of the lookup table by each performing some of the iterations of the overall search. For example, if the lookup table has 64 K entries, the binary search engine 66 performs the first eight iterations of the search and binary search engine 68 performs the last eight iterations. Additionally, the first stage memory 70 does not contain the entire lookup table. Instead, it only contains 256 entries needed for the first eight iterations of the search. The 256 entries are determined and copied from the lookup table and include the successive midpoint combinations from the lookup table needed for the first eight iterations. Once the binary search engine 66 completes its eight iterations, the results are passed to binary search engine 68. Binary search engine 68 then uses the results as a starting point for its eight iterations of the binary search. A substantial amount of memory is saved by only using successive midpoint combinations in the memory 70. Additionally, although two search engines are shown, any desired number of search engines may be used. For example, for a 16 iteration search, 16 binary search engines can be used with each search engine performing one iteration. Alternatively, 4 binary search engines may be used with each binary search engine performing 4 iterations. Still further, the partitioning of iterations across search engines need not be equal. Also, the lookup table can be any desired length. Consequently, the binary search engines can perform any number of iterations depending on the particular application.

After binary search engine 68 completes the binary search, the results are passed to forwarding decision logic 72, which examines the results and applies a predetermined set of rules to determine whether the network frame should be forwarded and which port or ports it should be forwarded to. Forwarding decision logic may also examine the level of priority of the network frame. Higher priority frames are typically forwarded by the switching device 50 before lower priority frames.

When the forwarding decision logic 72 determines that a frame is to be forwarded to other ports in switching device 50, it passes the network frame to the port intercommunication logic 54. Port intercommunication logic 54 includes a switch fabric 76 and a switch fabric control 78. Switch fabric 76 can take a variety of forms. For example, the switch fabric can be a cross-bar switch, which is commonly used in telecommunications switching. The cross-bar switch creates a path between a receiving port and a transmitting port so that the network frame may be passed therebetween. A wide variety of cross-bar switches may be used, such as cut-through switches, interim cut-through switches, and store-and-forward switches. Other types of switch fabrics may also be used. For example, switch fabric 76 may also be a central memory using a bus arbitration device and a central bus. Using a shared-memory bus architecture, all ports access a central located memory pool. The ports can access the central memory through a common bus when an arbitration device grants access. Another possible switch fabric that can be used is a parallel access shared-memory architecture. In a parallel access shared memory, all ports share a central memory location. However, a bus arbitration scheme is not used. Instead, every port has a dedicated path into and out of the central memory fabric. Therefore, all ports can simultaneously access the centralized memory pool at any time. A wide variety of existing switch fabrics or later developed switch fabrics may also be used. The particular switch fabric and switch fabric control is not of importance to the invention.

Switch fabric control 78 controls network frames as they are passed through the switch fabric. In the case where the switch fabric is a cross-bar switch, the switch fabric control is typically called a scheduler. The scheduler establishes a connection within the cross-bar switch so that a search engine on one port can directly pass a network frame to a search engine on another port. In the case where the switch fabric is a memory, the switch fabric control tells a receive-side search engine where to store the frame in memory. After the frame is stored in memory, the switch fabric control signals a transmitting-side port that the network frame is ready to be transmitted and provides the address of the memory location where the frame in located. The switch fabric control may also provide priority information to the transmitting-side port.

FIG. 5 shows a flow chart of a method used by the switching device 50 for forwarding network frames. In step 80, the media interface 56 receives a network frame from the network and passes the frame to search engine 60. The network frame contains a destination address that indicates the ultimate destination for the network frame. In step 82, search engine 60 searches memories 58, 70 to determine whether the destination address from the network frame is located within the lookup table. If a network address matches the destination address, a port that the frame should be forward to is also obtained from the lookup table. Assuming that the destination address was properly found in the lookup table and the appropriate port was determined, the search engine passes the search results to switch fabric control 78 (step 84). In step 86, search engine 60 transfers the network frame through switch fabric 76. If the switch fabric is a cross-bar switch, the switch fabric control 78 establishes the connection in the switch fabric and communicates to search engine 60 when to send the network frame. If the switch fabric is a central memory with or without bus arbitration, the switch fabric control tells search engine 60 where in the switch fabric to store the network frame. Search engine 60 then stores the network frame at the indicated location. The switch fabric control also informs the other ports of where the network frame is stored so that they may properly access it within the switch fabric. Regardless of the technique used with the switch fabric, the network frame is obtained from the switch fabric and transmitted on one or more ports (step 88).

Figure 4A:
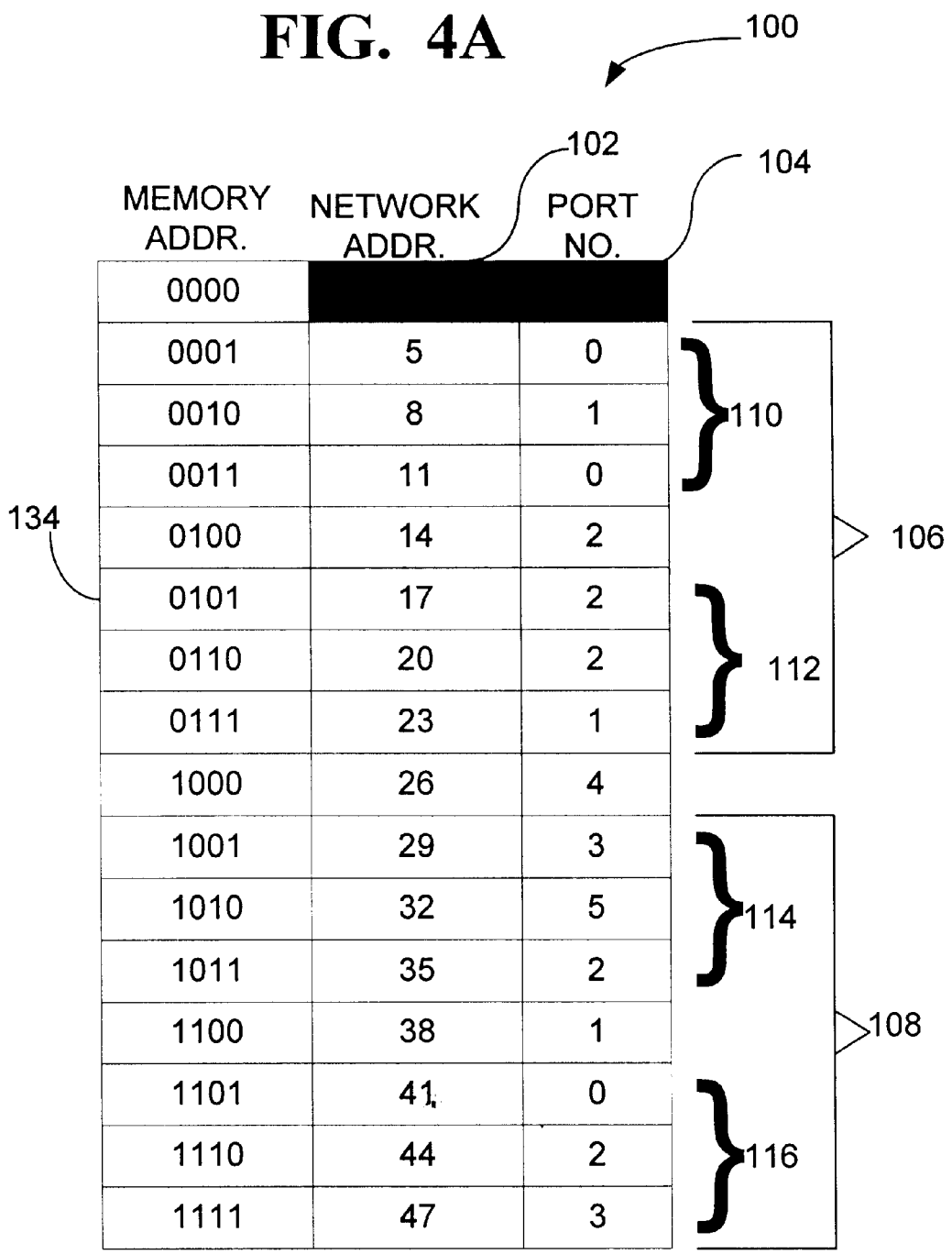
FIG. 4A shows a lookup table in sorted order according to another aspect of the invention.

FIG. 4A shows an example lookup table 100 having 16 data entries, 0000B through 1111B. Each table entry includes two or more fields including, an address field 102, illustrated as a network address, and a forwarding information field 104, illustrated as a port number. Although a network address field is shown, other addresses used in switching devices may be used. The forwarding information field also may contain information other than the port number. For example, the forwarding information field may analyze information related to the protocol format (e.g., MAC) that the address is in to determine which port to forward the network frame to. The network address field 102 contains network addresses in sorted order (e.g., ascending or descending order). The port number field 104 contains the port associated with the network address field. One or more of these data fields may be deleted, or alternatively, additional fields may be used. Additional fields may, for example, show a priority status associated with the network address. The network address field 102 identifies a destination to transmit the network frame to, such as a computer on a network. The network address field is used as a key for accessing the other fields (often called a payload) in a table entry. Address 0000B is empty so that the lookup table contains an odd number of entries. The midpoint of the table is at address 1000B and the lookup table can be equally divided into two portions 106 and 108 with equal numbers of data entries. The first portion 106 can similarly be divided into two portions 110, 112 with a midpoint at address 0100B. The second portion 108 also can be divided into two portions 114, 116 with a midpoint at address 1100B. By determining successive midpoints, a binary search tree can be generated.

Figure 4B:
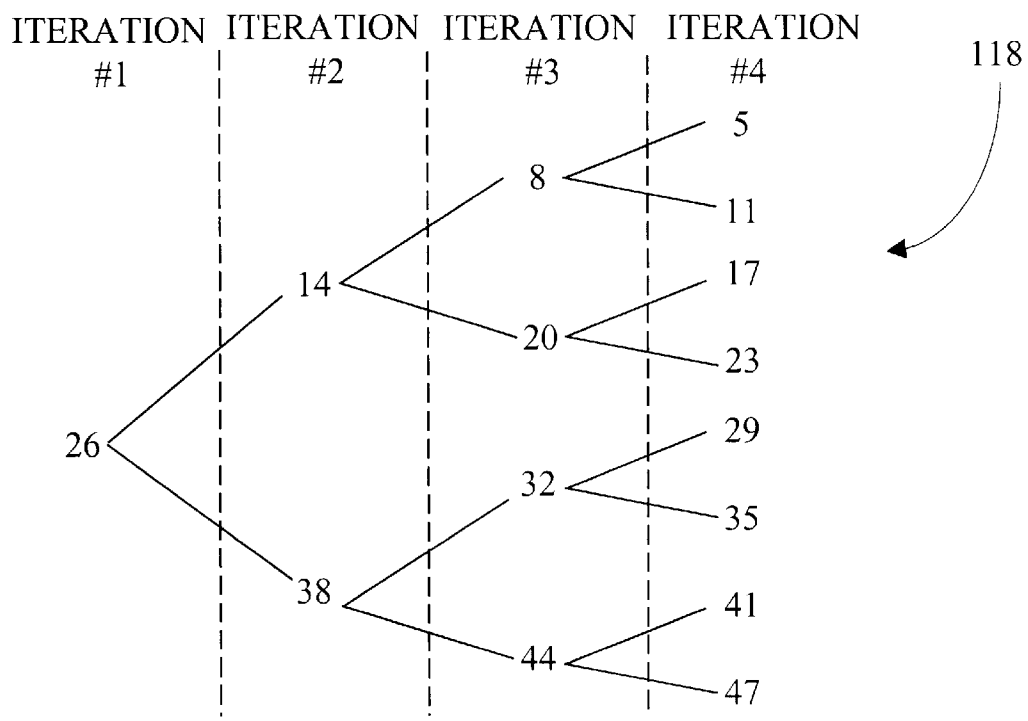
FIG. 4B shows the lookup table of FIG. 4A in binary tree format and showing four iterations of a binary search.

FIG. 4B shows a binary search tree 118 for the lookup table 100 of FIG. 4A. The search tree shows four iterations, which are the maximum number of iterations required for any search on a 16 entry table (i.e., $2^4=16$). The tree is formed by determining the successive midpoints, called nodes, in the lookup table as described in relation to FIG. 4A. To perform a binary search, the search term is compared against the network address located at the midpoint address 1000B of the lookup table (i.e., 26). If the search term is less than 26, it is compared to 14. Alternatively, if it is greater than 26, it is compared to 38, and so on, until a match is found or the search fails. Each comparison that is performed is another iteration of the binary search.

Figure 4C:
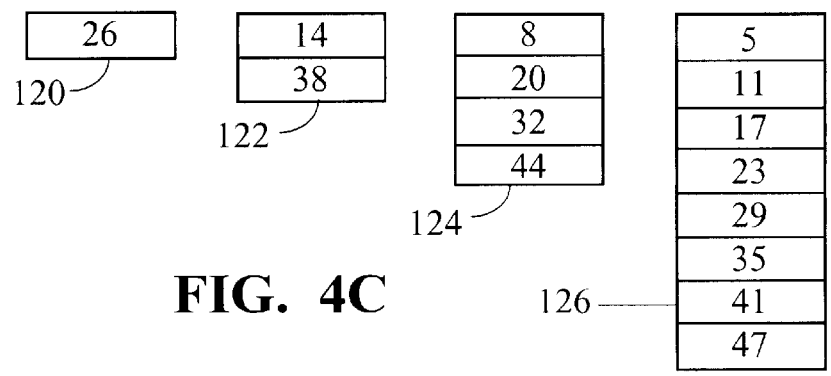
FIG. 4C shows a memory configuration for a switching device having four search engines with each search engine performing one of the iterations of FIG. 4B.

FIG. 4C shows that the different iterations of the binary search may be divided amongst 4 different binary search engines connected in series. A memory 120 for a first search engine only requires one data entry (one node) for the first iteration of the binary search, which represents the midpoint of the lookup table. A memory 122 for a second search engine requires two data entries for the second iteration, which represent the midpoints of portions 106 and 108 of the lookup table 100 (See FIG. 4A). A memory 124 for a third search engine contains additional successive midpoints of the lookup table needed for the third iteration. And a memory 126 for a fourth search engine contains the remaining data entries of the lookup table. The fourth memory 126 may also contain the entire lookup table 100. The memories 120, 122, and 124 (called the precursor memories) may include only the network address field of the lookup table, without any payload fields. Alternatively, the precursor memories 120, 122, and 124 may include the payload information so that the lookup table is effectively distributed amongst many memories, even though it is a unitary database. In any event, the precursor memories contain successive midpoint possibilities (nodes) for the different iterations of a binary search and the nodes are stored adjacent to one another. The precursor memories could contain additional table entries other than just the successive midpoint possibilities, if desired.

Figure 4D:
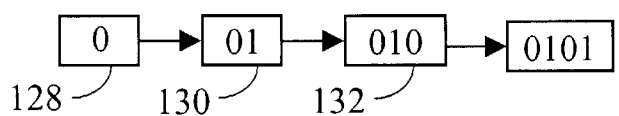
FIG. 4D shows search results that are passed between search engines from binary searches performed on the lookup table of FIG. 4A.

FIG. 4D shows an example of data passed between the four search engines of FIG. 4C in searching for the network address 17 (the key) located at address 0101 in the lookup table (see FIG. 4A). As comparisons are made during iterations of the binary search, the final address of 0101 is generated. That is, the first search engine generates the most significant bit, the last search engine generates the least significant bit, and the intermediate two bits are generated by the intermediate search engines. When a comparison is made, if the key is less than the network address obtained from the lookup table, a zero is passed to the next search engine. Alternatively, if the key is greater than the network address, a one is passed to the next search engine. Thus, with the key being 17, the first search engine compares 26 (the first iteration) and 17. Since 17 is less than 26, a 0 is passed to the next search engine in series as indicated at 128. The 0 represents the most significant bit of the final address where the network address 17 resides in the lookup table. The next search engine then compares 17 against 14, since 38 is no longer a possibility. Since 17 is greater than 14, the next bit in the address is a 1. Consequently, a 1 is appended to the most significant bit and a 01 is passed to the next search engine as indicated at 130. The next search engine then compares 17 and 20. Since 17 is less than 20, a 0 is appended to the previous passed address resulting in a 010 being passed to search engine 4, as indicated at 132. The last search engine must then compare 17 against 17 to obtain an address of 0101, which is the appropriate address in the lookup table (See FIG. 4A at 134).

FIG. 6 shows a flowchart of a method for performing binary searches as described in FIGS. 4A–4D. In step 136, multiple search engines are coupled in series. Virtually any number of search engines may be used. For example, FIG. 3 shows two search engines, while FIG. 4C describes using four search engines. The invention can easily be extended to eight, sixteen, or any other number of search engines. Each search engine that performs iterations of the binary search has its own separate memory (step 138). The memories for the search engines store nodes (the network address field with or without the payload information) needed for that search engine to perform its respective iterations of the binary search (step 140). The nodes are the successive midpoint possibilities of the lookup table in binary tree format. In step 142, a first search engine in the series performs a predetermined number of iterations of the binary search. The results of the iterations are then passed to the next search engine in the series (step 144). In step 146, a check is performed to see whether the results are being passed to the last search engine in the series. If not, then steps 142 and 144 are repeated. If yes, then the final iterations of the binary search are performed and the results are passed to the forwarding decision logic (step 148).

Figure 7:
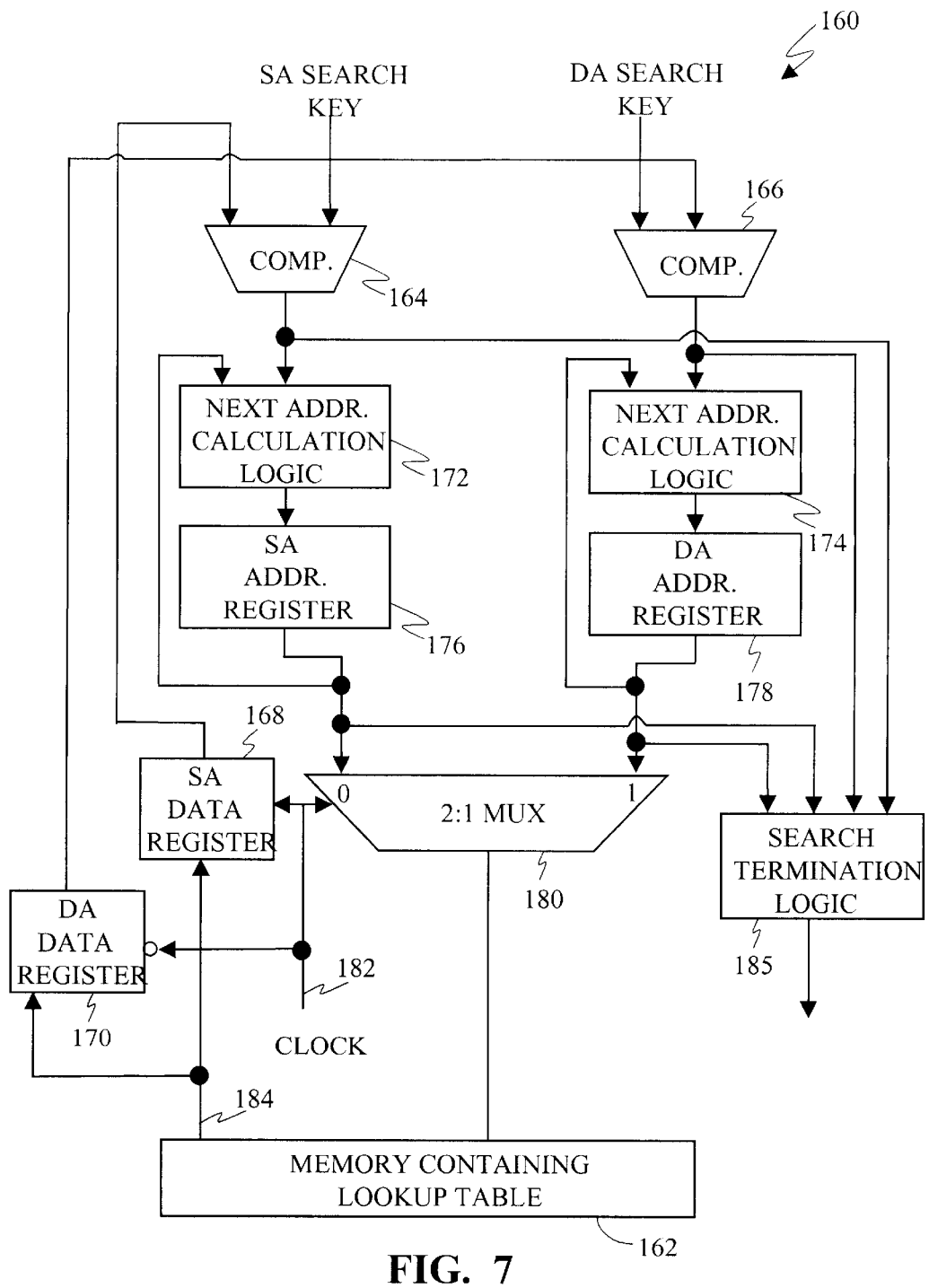
FIG. 7 shows a detailed circuit diagram of a binary search engine according to another aspect of the invention where source and destination searches are performed concurrently.

Although a wide variety of binary search engines can be used in the method and apparatus described in FIGS. 1–6, a particular search engine is shown in relation to FIGS. 7, 8A, and 8B. This search engine can also be used independently of the method and apparatus of FIGS. 1–6. In particular, the search engine can be used with searching techniques other than binary searches including linear searches, CAM, binary radix trees, hashing, etc.

Prior search engines perform a search for the source address from the network frame and, only when the source address search is completed, perform a search for the destination address (See FIG. 2). The present invention, by contrast, performs both source and destination address searches concurrently. FIG. 7 shows a search engine 160 coupled to a memory 162 containing a lookup table. The search engine 160 includes a source address comparator 164 and a destination address comparator 166. The source address comparator 164 has one input coupled to a source address (SA) search key. This SA search key is the source address obtained from the network frame and passed to the binary search engine 160 by the packet analysis and key extraction logic 64 (see FIG. 3). A second input to comparator 164 is coupled to a source address data register 168 that contains a network address most recently obtained from memory 162 during a previous iteration of the source address search. The destination address comparator 166 also has two inputs with one coupled to a destination address (DA) search key obtained from the network frame and the other input coupled to a destination address data register 170 containing a network address obtained from the memory 162 during a previous iteration of the destination address search. The output of the comparators 164, 166 are coupled to respective next address calculation logic circuits 172, 174. The next address calculation logic circuits 172, 174 use the lookup table address from the previous search iteration and the results of the comparators 164, 166 to determine the next lookup table address to analyze. The logic circuits 172, 174 make such a determination of the next address based on the nodes (i.e., successive midpoints) of the lookup table in the case of a binary search. In the case, of a linear search, the next address is simply the previous address plus one. Thus, the logic circuits 172, 174 perform different functions based on the application. The outputs of logic circuits 172, 174 are coupled to respective SA and DA address registers 176, 178. The outputs of the address registers 176, 178 are coupled to multiplexer 180 and are also fed back into next address calculation logic 172, 174, respectively. The multiplexer 180 is coupled to a clock line 182 that switches a multiplexer output so that the contents of the SA address register 176 and the DA address register 178 are passed to memory 162 in an alternating fashion. The contents of the SA and DA address registers 176, 178 contain an address of a lookup table entry and when applied to memory 162 causes the memory to output data (i.e., a network address) on a data output 184. Clock 182 is also coupled to both data registers 168, 170 and is synchronized so that data is latched into source data register 168 when the multiplexer 180 passes the contents of source address register 176. Similarly, data register 170 latches the data output 184 of memory when the address stored in DA address register 178 passes through the multiplexer 180. Search termination logic 185 determines when a search is complete by analyzing outputs of the address registers 176, 178 and the comparators 164, 166. An output of the search termination logic 185 can be passed to the forwarding decision logic 72 (see FIG. 2) or to another search engine connected in series to signal when a search is complete and to pass the results of the search.

FIG. 8B shows a timing diagram for the circuit of FIG. 7. A clock signal 186 is at twice the frequency of the clock on clock line 182. Three cycles 188, 190, and 192 of clock signal 186 are shown. During a first clock cycle 188, the SA address register 176 (FIG. 7) is already loaded with a lookup table address and the multiplexer 180 passes that address to the memory 162. Consequently, memory 162 outputs data (a network address) on data output 184 corresponding to the address in the SA address register. At the end of cycle 188, the source data register 168 is loaded with the data from the memory 162. Also during cycle 188, logic circuit 174 is calculating the next lookup table address to analyze for the destination address search and the results are stored in DA address register 178. Clock cycle 188 represents the start of a source address search iteration.

During clock cycle 190, comparator 164 compares the SA search key and the SA data register 168. The next address calculation logic 172 determines the next lookup table address to analyze for the search, and the results are loaded into the SA address register 176. Also during clock cycle 190, the output of the DA address register is passed through multiplexer 180 and the corresponding data from memory 162 is latched into DA data register 170. Clock 190 represents the start of a destination address search iteration. At the end of clock cycle 190, the source address search iteration is completed. Thus, clock cycles 188, 190 represent a complete source address search iteration in a search requiring multiple iterations.

During clock cycle 192, another source address search iteration is started and the destination address search iteration is completed. The comparator 166 compares the DA search key and the output of the DA data register 170. The next address calculation logic 174 calculates the next lookup table address to examine and loads the calculated address into the DA address register. Thus, during the three clock cycles 188, 190, and 192 both a source and destination address search iterations are performed concurrently. Additionally, the source and destination address searches are independent of each other.

The hardware of FIG. 7 can be modified while maintaining the same timing diagram of FIG. 8B. For example, the multiplexer 180 can be removed and the address registers 176, 178 can have tristate outputs with the clock line 182 coupled to the address registers 176, 178. Thus, the clock switches the address registers 176, 178 in alternating fashion onto a common bus attached to memory 162. Other modifications can also be made to the hardware, but the general timing diagram of FIG. 8B should remain the same.

FIG. 8A is a flowchart summarizing the steps for concurrently performing source and destination address searches. During a first clock cycle, a network address is obtained from the lookup table as a first phase of a source address iteration (step 194). During a second clock cycle (step 196), the network address is compared to the SA search key. The next address calculation logic 172 reads the comparator 164 and determines what lookup table address should be accessed next. Also during the second cycle, the lookup table is accessed for the next network address needed for a first phase of a destination address iteration and the source address iteration is completed. Finally, during a third cycle (step 198), the destination address iteration is completed by resolving the next network address to analyze for the destination address search. Also, the first phase of the source address iteration is repeated. Although only three clock cycles are shown, the clock is continuous.

A wide variety of searching techniques can be used with the concurrent search embodiment including binary, linear, CAM, binary radix trees, hashing and other types of searches.

Figure 9:
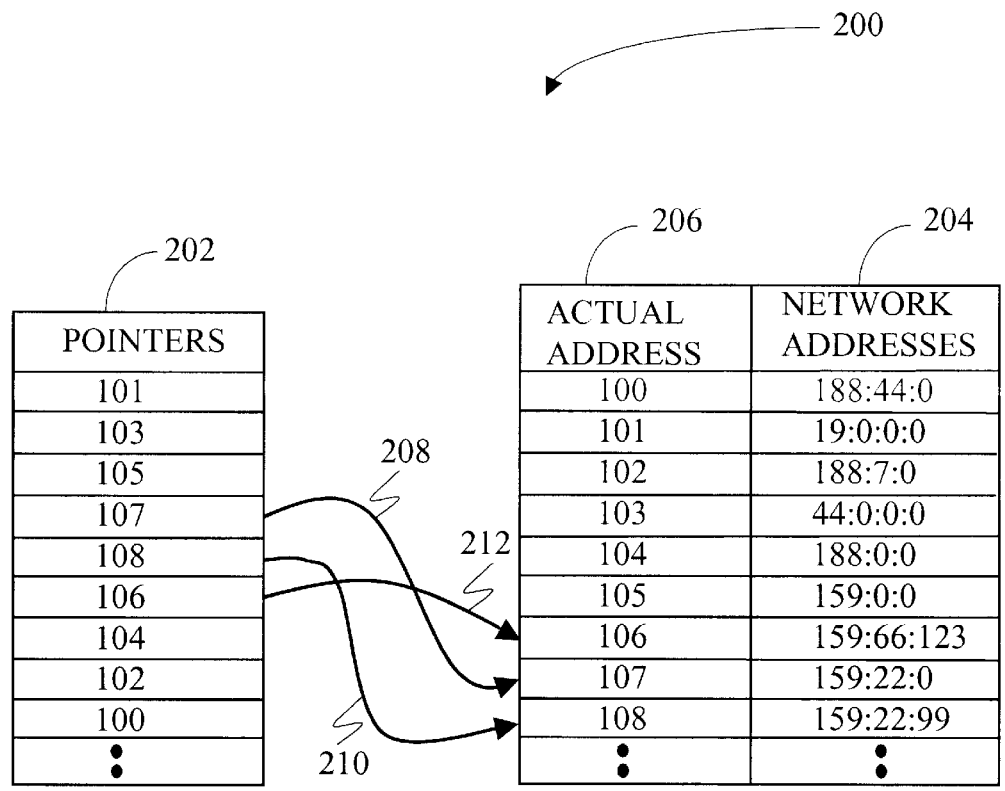
FIG. 9 shows another example of a lookup table using pointers to access the network addresses.

FIG. 9 shows another example of a lookup table 200 that may be used according to the invention. The lookup table includes a list of pointers 202 and network address data 204 stored in the memory within the switching device. The pointers point to the network address data 204. An example of actual memory addresses is shown in column 206 for illustrative purposes. Notably, neither the network addresses 204 nor the list of pointers 202 are stored in sorted order. However, the contents of data pointed to by the list of pointers 202 are stored in sorted order. For example, a pointer 208 points to address 107, which contains network address 159:22:0. A next pointer 210 in the list points to address 108 which contains the network address 159:22:99. The next pointer 212 points to address 106 which contains the network address 159:66:123. Although the list of pointers 208, 210, and 212 are not in order (since the pointers are 107, 108, 106, respectively) the data pointed to by the pointers is in order since addresses 159:22:0, 159:22:99 and 159:66:123 are in ascending order.

Thus, the lookup table according to the invention does not need to have data stored in contiguous addresses. Instead, network addresses may be in one memory location and forwarding information (such as port numbers) may be stored in other locations of memory. Pointers or some other technique for linking associated data is then used.

Having described and illustrated the principles of our invention with reference to preferred embodiments thereof, it will be apparent that these embodiments can be modified in arrangement and detail without departing from the principles of the invention.

For example, although the port is shown as including separate components, such components can be formed in a single integrated circuit. Additionally, other circuit components, such as the port intercommunication logic 54 can also be included in the same integrated circuit as the port 52.

Additionally, any of the components of the switching device can be performed by hardware, software, or a combination thereof. The invention should not be limited to the particular technique (whether hardware or software) for carrying out the methods and apparatus described herein. For example, the search engine can be a microprocessor running software or an ASIC where the searches are performed in hardware.

Further, although the search engines are generally shown performing equal iterations of binary searches, it is not necessarily so. That is, the search engines can perform unequal iterations of searches. For example, in a 16 iteration search, a first search engine can perform 9 iterations and a second search engine can perform 7 iterations. Other variations in the number of iterations can easily be applied and depends on the particular application and number of search engines used.

Still further, although the search engine of FIG. 7 shows two comparators and two next address calculation logic circuits, one of each may be used instead, with the clock controlling whether the SA address register or the DA address register is read by the next address calculation logic circuit. Additionally, the clock controls the single comparator so that only one of the DA data register and SA data register are compared at a time to one of the SA and DA search keys.

Still yet further, although the lookup table is shown as having all memory locations filled, in practice this is not generally the case. Instead, the memory has only a portion filled with lookup table values and the remaining portion is padded with dummy values. For example, the table of FIG. 4A may have only 9 lookup table entries with the remaining memory locations containing dummy values. In the case of an ascending table, the dummy values are a number sufficiently large enough that no network address can be confused with them. In the case of a descending table, the dummy values are a number sufficiently small enough that no network address can be confused with them. Additionally, the lookup table of FIG. 4A contains only 16 entries for illustration. In practice, lookup tables contain hundreds of thousands of entries.

Still further, although the lookup table is shown as containing table entries with multiple fields, the lookup table may be a list of pointers, and the pointers point to the network addresses and other fields. Additionally, the lookup table can be any type of data structure or array that store data.

Yet further, the network packets can include any kind of data including video images, voice data during a phone call, a document, etc.

Still further, when a port receives a network frame, it can analyze the destination address (at layer two and layer three) and it can also analyze layer 4 policy information if desired.

Still yet further, the present invention may be applied to LAN's, WAN's, the Internet, Intranets, telephone networks, or any other network.

Additionally, although the lookup table is described as containing network addresses, the lookup table may include other keys. A key may include a network address exclusively or in combination with additional information. Alternatively, a key may include lookup information other than network addresses. Additionally, the switching device may receive network frames that include search keys. Alternatively, the search key may be derived from the network frame. For example, the search engine may use characteristics of the network frame, such as what port it was received on or what protocol format it is in, to derive the search key. The search key, which is either explicitly included in the network frame or derived therefrom, is compared to the lookup table which includes lookup keys.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. A method of forwarding a network frame in a network forwarding device, the method comprising the steps of:

providing at least two search engines coupled in series;

storing a lookup table of network addresses and port numbers associated with the network addresses;

receiving a network frame including a destination address;

searching the lookup table for a network address that matches the destination address, the searching step including performing an N iteration binary search with the search engines performing different iterations of the binary search;

obtaining a port number associated with a network address found in the searching step; and forwarding the network frame to the port associated with the obtained port number.

2. The method of claim 1 wherein the providing step includes providing any number of search engines from 2 to N and wherein each search engine performs an equal number of iterations of the N iteration search.

3. The method of claim 1 wherein the providing step includes providing any number of search engines from 2 to N and wherein the search engines perform an unequal number of iterations of the N iteration search.

4. The method of claim 1 wherein the providing step includes providing any number of search engines from 2 to N and wherein only some of the search engines perform iterations of the N iteration search.

5. The method of claim 1 further including the steps of:

determining nodes of the lookup table in a binary tree format; and storing the nodes in adjacent memory locations in a precursor memory coupled to one of the search engines.

6. The method of claim 5 wherein the nodes are a subset of the lookup table and only information associated with the nodes is stored in the precursor memory.

7. The method of claim 5 further including the steps of:

using a first search engine, comparing the destination address of the network frame with the nodes to perform at least one iteration of the N iteration binary search and passing the search results to a second search engine; and using the second search engine, using the results of the first search engine as a starting point and performing at least one iteration of the N iteration binary search.

8. The method of claim 1 wherein the searching step includes:

performing a first half of the N iterations in one search engine;

passing results from the first half of N iterations to a second search engine; and performing a second half of the N iterations in a second search engine.

9. The method of claim 1 wherein the searching step includes:

performing a first quarter of the N iterations in one search engine;

passing results from the first quarter of the N iterations to a second search engine;

performing a second quarter of the N iterations in a second search engine;

passing results from the second quarter of the N iterations to a third search engine;

performing a third quarter of the N iterations in a third search engine;

passing results from the third quarter of the N iterations to a fourth search engine; and performing a fourth quarter of the N iterations in the fourth search engine to complete the binary search.

10. The method of claim 1 further including:

determining a midpoint of the lookup table;

copying the midpoint to a precursor memory associated with a first search engine;

dividing the lookup table into two halves with a first half being greater than the physical midpoint and the second half being less than the physical midpoint;

determining a midpoint of the first half;

copying the midpoint of the first half to the precursor memory;

determining a midpoint of the second half;

copying the midpoint of the second half to the precursor memory; and performing at least two iterations of the searching step using the precursor memory.

11. A network forwarding device for searching a lookup table, comprising:

a first stage search engine;

a second stage search engine coupled in series to the first stage search engine;

a first memory coupled to the first stage search engine;

a second memory coupled to the second stage search engine;

a first database stored in the first memory, the first database including only entries selected from the lookup table needed to perform a portion of the iterations of an N iteration binary search;

a second database stored in the second memory, the second database including either the entire database or only entries selected from the lookup table needed to perform additional iterations of a binary search.

12. The network forwarding device of claim 11 wherein the first and second stage search engines together perform a search of N iterations and wherein the first search engine performs a first portion of the N iterations and the second search engine performs a second portion of the N iterations.

13. The network forwarding device of claim 11 further including a media interface coupled to a network cable for receiving network frames and coupled to the first stage search engine for passing the network frames to the first search engine for analysis.

14. The network forwarding device of claim 11 further including packet analysis logic coupled to the first stage search engine, the packet analysis logic for receiving network frames and extracting source and destination addresses therefrom.

15. The network forwarding device of claim 11 further including a switch fabric control coupled to the second stage search engine and wherein the second search engine passes search result information to the switch fabric control.

16. A network forwarding device comprising at least one precursor search engine coupled in series with a final stage search engine, the precursor search engine having a precursor memory coupled thereto for storing binary search node data points copied from a lookup table, the node data points stored adjacent to each other so that the precursor search engine performs a predetermined number of iterations of an N iteration binary search with the other at least one search engine in the series performing the remaining iterations of the N iteration search.

17. The network forwarding device of claim 16 wherein the search engines coupled in series perform source and destination address searches concurrently.

18. The network forwarding device of claim 16 wherein one search engine accesses a memory for performing a first search while another search engine in the series is performing another search that is independent of the first search.

19. A network forwarding device having multiple ports coupled to network segments, comprising:

a media interface for receiving a network frame including a destination address;

a final stage binary search engine;

a final stage memory coupled to the final stage binary search engine for storing a lookup table of network addresses and port numbers associated with the network addresses;

at least one precursor binary search engine coupled in series with the final stage binary search engine, and with one precursor binary search engine coupled to the media interface for receiving the network frame;

at least one precursor memory coupled to one of the precursor binary search engines and having stored therein nodes for a binary search copied from the lookup table, wherein the nodes are stored in sorted order;

a switch fabric for communicating with other ports in the network forwarding device; and a switch fabric control coupled to the final stage binary search engine that receives search results from the final stage binary search engine and that controls the switch fabric control so that the network frame is routed to the appropriate port within the network forwarding device.

20. The network forwarding device of claim 19 wherein the search engines perform a binary search on the lookup table for the destination address of the network frame, and wherein the binary search requires a maximum of N iterations and the precursor binary search engine performs a portion, but not all, of the N iteration search and passes search results to a next binary search engine in the series.

21. A method forwarding a network frame in a network forwarding device, the method comprising the steps of:

providing at least two search engines coupled in series;

storing a lookup table of keys and storing forwarding information associated with the keys;

receiving a network frame;

obtaining a search key associated with the network frame;

searching the lookup table for a key that matches the search key, the searching step including performing an N iteration binary search with the search engines performing different iterations of the binary search;

obtaining forwarding information associated with the key found in the lookup table; and forwarding the network frame based on the obtained forwarding information.

22. The method of claim 21 wherein the search key includes an address.

23. The method of claim 21 wherein the search key is explicitly within the network frame or derived therefrom.

24. A network switching device comprising:

a first search engine;

a second search engine coupled to the first search engine;

a first memory coupled to the first search engine; and a second memory coupled to the second search engine, characterized in that the first search engine receives a search key and performs a first search of the first memory for the search key, the first search engine passing results of the first search to the second search engine, the second search engine performing a second search of the second memory for the search key and appending results of the second search to the results of the first search, further characterized in that the first and second search engines together performs a search of N iterations, the first search engine performing a first portion of the N iterations in the first search and the second search engine performing a second portion of the N iterations in the second search.

25. The network switching device of claim 24, wherein the first memory includes a portion of a lookup table needed for performing the first search.

26. The network switching device of claim 24, wherein the second memory includes a portion of a lookup table needed for performing the second search.

27. The network switching device of claim 24, wherein the second memory includes all entries of a lookup table.

28. The network switching device of claim 24, wherein the first and second searches are binary searches.

29. The network switching device of claim 24, wherein the second search engine uses the results of the first search as a starting point in the second memory for performing the second portion of the N iterations.

30. In a network switching device, a method for forwarding a discrete information unit comprising:

generating a search key associated with the information unit;

searching a first memory for the search key using a first search engine and rendering a first search result;

passing the first search result to a second search engine;

searching a second memory for the search key using the second search engine and rendering a second search result;

appending the second search result to the first search result;

retrieving forwarding information based on the appended search result; and forwarding the information unit or not based on a the retrieved forwarding information;

wherein, the first and second search engines together perform a search of N iterations, the first search engine performing a first portion of the N iterations in the first search and the second search engine performing a second portion of the N iterations in the second search.

31. The method of claim 30, wherein the first memory includes a portion of a lookup table needed for performing the first search.

32. The method of claim 30, wherein the second memory includes a portion of a lookup table needed for performing the second search.

33. The method of claim 30, wherein the first and second searches are binary searches.

34. The method of claim 30, wherein the first and second searches are binary searches.

35. The method of claim 30, wherein the second search engine uses the results of the first search as a starting point in the second memory for performing the second portion of the N iterations.

* * * * *